United States Patent [19]

Kieffer et al.

[11] Patent Number: 5,322,548
[45] Date of Patent: * Jun. 21, 1994

[54] RECOVERY OF NIOBIUM METAL

[75] Inventors: Bernard F. Kieffer, Huntsville, Ala.; John R. Peterson, Salem, Oreg.; Timothy R. McQueary, Sweet Home, Oreg.; Matthew A. Rossback, Albany, Oreg.; Lloyd J. Fenwick, Corvallis, Oreg.

[73] Assignee: Teledyne Industries, Inc., Albany, Oreg.

[*] Notice: The portion of the term of this patent subsequent to Feb. 23, 2010 has been disclaimed.

[21] Appl. No.: 721,890

[22] Filed: Jun. 27, 1991

[51] Int. Cl.[5] ............................................. C01G 33/00
[52] U.S. Cl. ...................... 75/419; 75/10.43; 75/622
[58] Field of Search ........................ 75/10.43, 622, 419

[56] References Cited

U.S. PATENT DOCUMENTS

| | | | |
|---|---|---|---|
| 2,164,198 | 6/1939 | Clements et al. | 148/4 |
| 2,474,021 | 6/1949 | Vining | 23/184 |
| 2,553,444 | 5/1951 | Dunn et al. | 241/20 |
| 2,682,445 | 6/1954 | Frey | 23/87 |
| 2,849,275 | 8/1958 | Bleecker | 23/14 |
| 2,886,616 | 5/1959 | Mertz et al. | 260/683.15 |
| 2,992,094 | 7/1961 | Powell | 75/10.43 |
| 3,053,620 | 9/1962 | Greenberg et al. | 23/87 |
| 3,230,077 | 1/1966 | Hiller | 75/84.5 |
| 3,300,297 | 1/1967 | Fields | 75/24 |
| 3,322,510 | 5/1967 | Anselin et al. | 23/347 |
| 3,356,513 | 12/1967 | Washburn | 106/55 |
| 3,425,826 | 2/1969 | Schmidt et al. | 75/84 |
| 3,461,190 | 8/1969 | Kemeny | 263/52 |
| 3,539,165 | 11/1970 | Ingels | 263/40 |
| 3,573,000 | 3/1971 | Toomey et al. | 23/277 |
| 3,639,101 | 2/1972 | Washburn | 23/203 R |
| 3,854,882 | 12/1974 | Washburn | 23/253 A |
| 3,999,981 | 12/1976 | Brandstatter | 75/84 |
| 4,029,740 | 6/1977 | Ervin, Jr. | 423/251 |
| 4,211,754 | 7/1980 | Van Hecke | 75/622 |
| 4,318,897 | 3/1982 | Gonczy | 423/644 |
| 4,425,318 | 1/1984 | Maeland et al. | 423/644 |
| 4,440,737 | 4/1984 | Libowitz et al. | 423/644 |
| 4,607,826 | 8/1986 | Ron | 266/251 |
| 4,720,300 | 1/1988 | Nishizawa et al. | 75/84.5 |
| 4,727,928 | 3/1988 | De Vynck et al. | 164/469 |
| 4,728,507 | 3/1988 | Worcester | 423/645 |
| 4,741,894 | 5/1988 | Melas | 423/592 |
| 4,812,301 | 3/1989 | Davidson et al. | 423/440 |
| 4,913,778 | 4/1990 | Lee et al. | 203/29 |

FOREIGN PATENT DOCUMENTS

| | | |
|---|---|---|
| 470022 | 12/1950 | Canada . |
| 541516 | 5/1957 | Canada . |
| 541517 | 5/1957 | Canada . |
| 554840 | 3/1958 | Canada . |
| 903034 | 5/1953 | Fed. Rep. of Germany . |
| 1068683 | 11/1959 | Fed. Rep. of Germany . |
| 1082240 | 5/1960 | Fed. Rep. of Germany . |
| 0339426 | 7/1989 | Japan . |
| 485021 | 6/1938 | United Kingdom . |
| 771144 | 3/1957 | United Kingdom . |
| 866771 | 3/1961 | United Kingdom . |
| 660397 | 11/1962 | United Kingdom . |
| 910289 | 11/1962 | United Kingdom . |
| 1211757 | 3/1973 | United Kingdom . |

OTHER PUBLICATIONS

Mellor, "A Comprehensive Treatise on Inorganic Chemistry", vol. VIII, Longmans, Green & Co., 1947, pp. 124–126.

Hattangadi, "How to Set a Periodic Table", Industrial Chemist, vol. 9, No. 5, 1988, pp. 20–23.

(List continued on next page.)

Primary Examiner—Peter D. Rosenberg
Attorney, Agent, or Firm—Shoemaker & Mattare, Ltd.

[57] ABSTRACT

Ferroniobium, ferrotantalum and ferrovanadium alloys are hydrogenated to facilitate crushing then nitrided, and then acid-leached to produce a soluble iron nitride leachate and a niobium, tantalum or vanadium nitride residue which residue can be denitrided to yield the metal which can be recovered by melting.

7 Claims, 1 Drawing Sheet

OTHER PUBLICATIONS

Hart, The Reduction of Columbic Acid and the Measurement of the Oxidation Potential of the Pentavalent-Trivalent Columbium System, 226-7, 1926.

Sherwood, Columbium, Rare Metals Handbook, pp. 149-177.

McClain et al., Zirconium-Hafnium Separation, Chapter 4, pp. 64-73, 1960.

Kroll et al., Pilot Plants, Production of Malleable Zirconium, vol. 42, No. 2, pp. 395-396, 1950.

Fairgrieve et al., Hafnium, Molybdenum Techniques Revealed, Journal of Metals, pp. 25-26, 1960.

Spink, Fused-Salt Scrubbing of Zirconium Tetrachloride, Transactions Aime, vol. 224, pp. 965-970, 1962.

Fairbrother, The Chemistry of Niobium and Tantalum, pp. 4, 5, 8-19, 1967.

de Hoboken, Production of Tantalum and/or Columbium, pp. 1-6.

Pennington, Derivatives of Columbian and Tantalum, 1985.

Duke, Resources and Planning Advisory Council, vol. VIII, pp. 1-51, 1969.

Stuart, Niobium, Proceedings of the International Symposium, pp. 3-16; 1237-1249, 1981.

Gibalo, Analytical Chemistry of Niobium and Tantalum, pp. 118-140, 1970.

Merrill, The Separation of Columbium and Tantalum by Means of Selenium Oxychloride, pp. 2378-2383, 1921.

RECOVERY OF NIOBIUM METAL

FIELD OF THE INVENTION

The present invention relates generally to the preparation of niobium metal and more particularly to the recovery of substantially pure niobium metal from ferroniobium alloys.

BACKGROUND OF THE INVENTION

The extraction of niobium (Nb) from ferroniobium (FeNb) has, in the past, been done in a variety of ways. The high cost of recovering niobium by the use of several of the known processes has deterred their commercial adoption.

Exemplary of the known methods include the extraction of niobium oxide ($Nb_2O_5$) from FeNb in a multiple step process. The niobium oxide can then be metallothermically or carbothermically reduced to yield metal suitable for further purification by melting.

The state of the art extraction processes include chlorinating FeNb directly to produce ferric chloride ($FeCl_3$) and niobium pentachloride ($NbCl_5$) by passing chlorine through a bed of FeNb held at a temperature of from about 500° C. to 1000° C.

The reaction can be characterized as follows:

$$FeNb + 4Cl_2 \rightarrow FeCl_3 + NbCl_5 + heat$$

This reaction is exothermic and once started provides considerable heat and must, therefore, be carefully controlled. The $FeCl_3$ and $NbCl_5$ produced must be separated and this is accomplished by passing the chlorides in the vapor state through a heated bed of sodium chloride (NaCl) where the $FeCl_3$ forms a eutectic composition with the NaCl and is thereby removed from the vapor process stream. The $NbCl_5$ can then be subsequently condensed by cooling.

This chlorination step utilizes toxic chlorine gas reacted exothermically at elevated temperatures and pressures. These conditions can produce severe corrosion and thereby potential safety problems. Special equipment is necessary for handling the highly pressurized, corrosive liquid chlorine and it must be safely vaporized, metered and fed into the reactor. Likewise, the most suitable material for reactor construction is graphite. This is a brittle material which can fracture and fail abruptly after a short time in use in this environment. Further, the chlorine is normally used in excess to ensure complete reaction with the FeNb and the excess must be neutralized creating an expensive, undesirable by-product.

The condensed $NbCl_5$ can, if desired, be distilled to achieve higher purity material. Distilled or undistilled, $NbCl_5$ is then hydrolyzed by its addition to water and then the bath is neutralized, and the insoluble product can optionally be dried before being calcined in a heated kiln in the presence of oxygen to produce $Nb_2O_5$. The hydrolysis and neutralization steps can produce undesirable by-products and the drying and calcining steps are both energy intensive and expensive.

The $Nb_2O_5$ obtained as described can then be metallothermically reduced with aluminum powder in a batch reaction to form Nb metal according to the following equation:

$$3Nb_2O_5 + 10Al \rightarrow 6Nb + 5Al_2O_3 + heat$$

This reaction is very exothermic attaining temperatures in excess of the melting point of the products which are then separated by gravity while in the molten state. While expensive, metallothermic reduction is effective with good yields.

The other methods for Nb extraction from FeNb involve caustic or carbonate fusions, which when leached or washed, give niobium oxide which is fairly pure and may be further purified by chlorination or other means presently known to the art. Ultimately, the oxide must be metallothermically reduced as previously described, or carbothermically reduced to Nb metal.

The process of reducing $Nb_2O_5$ carbothermically is difficult to do on a production basis since doing so requires large thermal input, vacuum vessels, and a careful balance of carbon to oxygen so that the resulting metal is not contaminated with either carbon or oxygen. If the carbon to oxygen ratio is maintained at nearly stoichiometric amounts, then the reaction proceeds rapidly until only a few percent of either remains unreacted. The reaction then proceeds slowly and it is difficult for it to reach completion. For this reason, carbothermic reduction is not currently used commercially.

Another method for extracting Nb from FeNb could theoretically be the direct electron beam melting and purification of FeNb by preferential vaporization of the Fe. This would be very expensive in practice as the melting point of FeNb is low and a great amount of electrical power is needed to superheat and vaporize the 5 to 40 weight percent of iron present. Though possible, it is not believed to be economically feasible.

OBJECTS OF THE INVENTION

It is, therefore, an object of the present invention to provide a novel process for recovering niobium metal from ferroniobium or ferrotantalum alloys while avoiding the difficulties present in the existing methods of extraction, where the current methods include the steps of direct chlorination, hydrolysis, calcination and aluminothermic reduction.

It is a further object of the present invention to provide a novel method of recovering niobium from ferroniobium or ferrotantalum alloys that requires less energy than the conventional extraction processes identified hereinbefore and is less costly and easier to conduct than the conventional methods which require the extensive handling of hazardous and corrosive materials.

SUMMARY OF THE INVENTION

Preferably, niobium is recovered, according to the present invention, from finely divided ferroalloys including ferrotantalum and ferroniobium alloys (FeNb) optionally preselected by first reacting the ferroalloy with hydrogen gas to form metal hydrides of ferroalloys, such as FeNb, in sufficient quantity to render the ferroalloy and the metal hydrides thereof friable and easily commutable into small particles. Next, the particulate ferroalloy and the metal hydrides formed are then nitrided by reaction with a suitable source of nitrogen at a sufficient temperature and for a sufficient period of time to separately form iron nitride and the non-ferrous metal nitride respectively. These nitrides are then separated preferably with an acid leaching step, and the non-ferrous metal nitride is thereafter subjected to a sufficient temperature for a sufficient period of time to decompose the metal nitride, thereby producing the elemental metal which is recovered after cooling. The recovered metal can then be melted by conventional means to produce metal ingots or other forms or shapes suitable for further fabrication operations.

DETAILED DESCRIPTION OF THE PREFERRED EMBODIMENT

Figure 1:
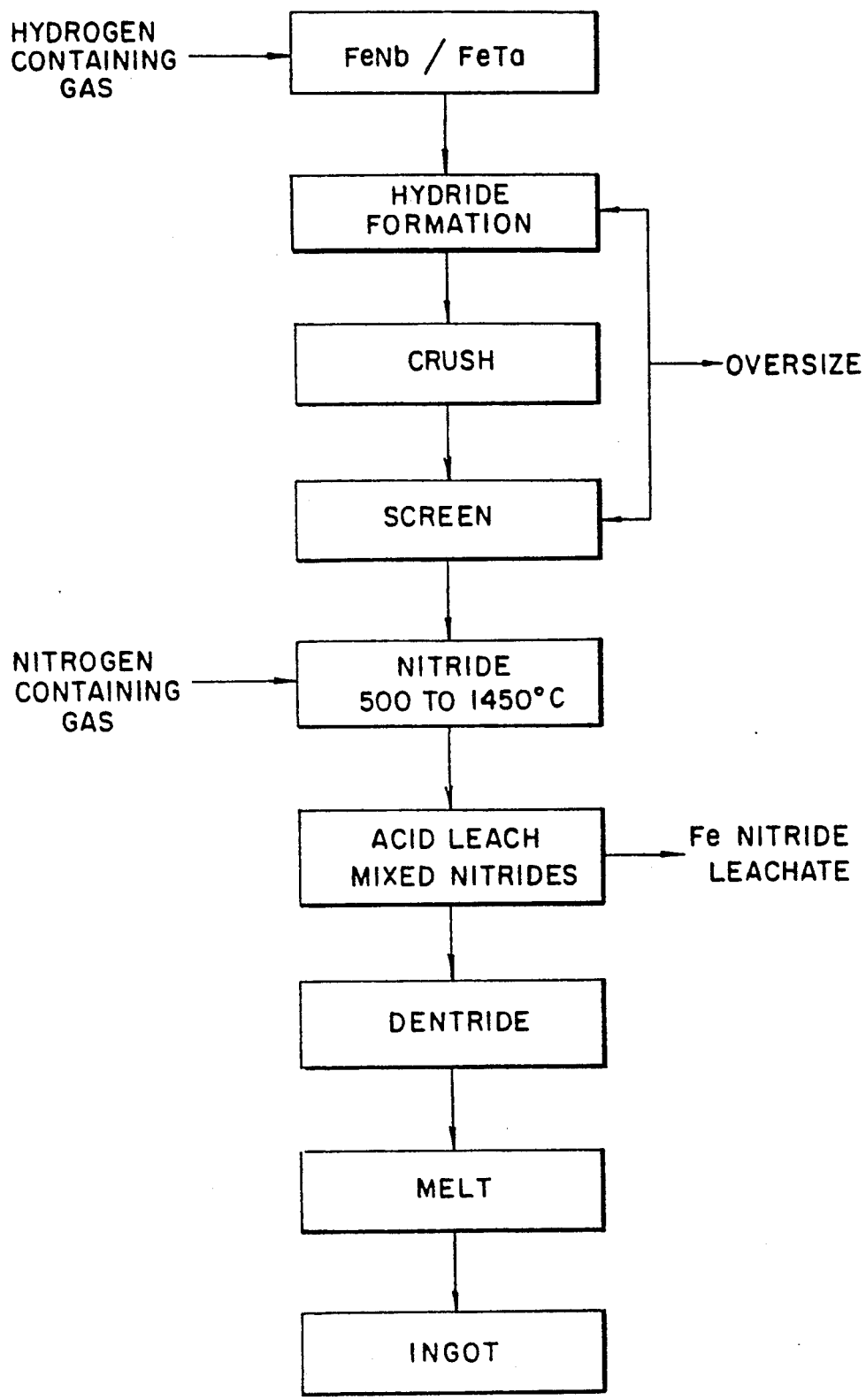
FIG. 1 is a schematic block diagram of the process of the present invention.

The process of the present invention is a novel method of extracting non-ferrous metals from ferroalloys including preferably Nb or Ta from FeNb or FeTa. The method also comprises a novel method of producing nitrides of Nb, Ta or V from their ferroalloys or from masteralloys containing in addition Ni or Al.

Exemplary of the process of the present invention, a starting material containing FeNb or FeTa or mixtures thereof or masteralloys thereof, is hydrided and then crushed or otherwise attritted or comminuted in a conventional manner to make a small enough particle size material suitable for use in the subsequent the nitriding reaction. The prepared particulate hydrided material of preferably smaller size than about 140 mesh is then nitrided in an atmosphere of nitrogen, or ammonia, or nitrogen and hydrogen, or any appropriate nitrogen containing atmosphere that contains little or no oxygen or other reactive gases. The nitriding reaction should be conducted at a high enough temperature to proceed relatively quickly. As time is important to most processes, this would preferably be done above about 500° C. but below about 1450° C. where the FeNb FeTa or masteralloys of either, are near their melting points. Within this temperature range, the nitride forming reaction will take from between about 6 hours to about 24 hours to be essentially complete depending on the size of the charge.

The use of temperatures below 500° C. while functional in that nitride formation will occur, will require a longer time to produce significant yields of the desired nitride products.

Given sufficient time to nitride the hydrided product of FeNb or FeTa, the temperature can then be raised above the temperature utilized in the nitriding reaction to allow the phases of iron nitride and niobium or tantalum nitride to initially undergo some separation by diffusion. The temperatures selected will affect the rate of diffusion. Optimally, the diffusion step is an effective separation technique if conducted at about 900° C. to about 1400° C. for between about 2 hours to about 40 hours. This phase separation process assists the next step of the process which is the leaching of the iron nitride away from the niobium nitride phase.

Two reports published by the Bureau of Mines, Nos. RI8079 and RI8103, describe nitriding the oxides of Ta, Nb and V in ammonia to form nitrides which may then be decomposed to the metal by melting in an arc or electron beam or by heating in a vacuum chamber. These reports do not, however, discuss the possibility of nitriding the metal hydrides in an overall process for producing the metal.

The original charge of FeNb or FeTa which is normally non-magnetic is, after nitriding, ferromagnetic indicating that the Fe has been freed from the Nb or Ta.

The nitrides of Fe are normally quite soluble in mildly concentrated acids, especially in HCl or $H_2SO_4$ of from about 1 Normal to about 36 Normal. Therefore, after nitriding, the iron nitrides may be leached away from the niobium or tantalum nitrides which are relatively insoluble in such acids. The leaching conditions and acid concentrations can be selected so as to maximize the separation and purity of the desired metal nitride. The previously described nitride formation need not be stoichiometric, it is only necessary that enough nitrogen is reacted to substantially affect the solubility of the Fe in acids. If employed, the high temperature phase separation by diffusion will also assist the subsequent leaching step by facilitating the removal of the iron nitrides away from the niobium or tantalum nitrides.

After the leaching is completed, usually in 4 hours in quantities of 250 lb of nitride and 940 liters of 2 N HCl acid, the residual insoluble remaining nitrides are then decomposed by heating to a temperature above the nitride decomposition temperature thereby driving off most of the nitrogen by the decomposition of the nitride. For further nitrogen removal, the most efficient method is electron beam melting. The making of nitrides of Ta, Nb and V in the overall process of this invention is possible by the described process, however, vanadium will not give up nitrogen beyond the solid solution level of approximately 0.3% so this process may not provide a suitable method for making very pure V metal. Since Nb nitrides are soluble in a mixture of hydrofluoric and nitric acids and the Ta nitrides and V nitrides are slightly soluble in aqua regia, these acids would not be the best choices for leaching the iron, but would have utility for the subsequent separation of those metal values from charges containing mixtures thereof. Hydrochloric acid is preferred due to its cost and utility in being able to substantially leach all the unwanted iron nitride, in addition to having a low environmental impact, and its ability to be easily neutralized.

Titanium, silicon, tungsten and carbon are some impurities in the FeNb and/or FeTa which partially follow the Nb or Ta through to the melting steps. In the chlorination of FeNb, these elements are mostly eliminated in the condensation of the $NbCl_5$. In the process of the present invention, the balance of these elements must be removed where possible by electron beam melting. The titanium and silicon can be vaporized whereas any carbon can only be removed with oxygen and the tungsten cannot be removed by differential vaporization at all. The following Examples more specifically show the preferred practice of the present invention.

EXAMPLE 1

Commercial metallurgical grade FeNb was ground to a size of less than 400 mesh and 48.6 gm sample was placed in a stainless steel boat in a furnace tube. The gas-tight furnace tube was purged with nitrogen to remove most of the air then the gas flow was set at 100 cc/minute $N_2$ and 600 cc/minute hydrogen. The temperature was raised to 1150° C. and held for 20 hours then cooled under a nitrogen purge. The reacted charge of FeNb was then analyzed for nitrogen and oxygen and then 12.96 gm was leached for 4 hours with 130 ml 2N HCl at 50° C. The insoluble product of the leaching was analyzed for nitrogen, oxygen and iron (Fe) and then compacted and arc melted in a button arc furnace. The metallic button was then analyzed.

TABLE 1

|   | Starting FeNb | Nitrided | Nitrided and Leached | Nitrided Leached and Melted |
|---|---|---|---|---|
| Fe | 28.6% | 27.1% | 2.7% | 2.68% |

TABLE 1-continued

| | Starting FeNb | Nitrided | Nitrided and Leached | Nitrided Leached and Melted |
|---|---|---|---|---|
| N | 81 ppm | 9.8% | 16.0% | 1.7% |
| O | 370 ppm | 0.8% | 2.0% | 1.1% |
| Si | 1.2% | — | — | 0.5% |
| Ti | 0.62% | — | — | 0.4% |

The product from this example would then be ready for further purification in an electron beam furnace or it could be used directly for alloying purposes.

EXAMPLE 2

In this example, 400 gm of hydrided FeNb comminuted to less than 100 mesh was placed in a stainless steel boat in a tube furnace. The tube was purged for 35 minutes with 300 cc per minute of nitrogen then the furnace was heated to 1150° C. and held at that temperature for 24 hours. During the 24 hour period, the nitrogen flow was reduced from 300 cc per minute to 168 cc per minute. After 24 hours, the nitrided FeNb reaction product was cooled under nitrogen to room temperature.

The 400 gm of FeNb had gained weight to 50 gm and was very ferromagnetic. The 439 gm were leached with 500 ml of 2N HCl for 4 hours then dried. The dried powder was then blended with 4% aluminum powder to assist compaction and electrical conductivity of the powder. A small button was arc melted from this compacted powder.

Analytical results of Example 2:

TABLE 2

| | Starting FeNb | Nitrided | Nitrided and Leached | Nitrided Leached and Melted |
|---|---|---|---|---|
| Fe | 28.6% | 25.1% | 0.8% | 0.77% |
| N | 81 ppm | 12% | 17% | 1.3% |
| O | 370 ppm | 0.32% | 1.1% | 0.19% |
| Si | 1.2% | — | — | 0.34% |
| Ti | 0.62% | — | — | 0.49% |

The results of these examples show that FeNb can be nitrided and leached to remove 89% to 97% by weight of the iron from FeNb. Silicon and titanium occurring in the FeNb are also partially removed by the processing with the silicon up to 80% and the Ti about 50%.

The resultant 80% to 90% denitrided product is a suitable feed for electron beam, plasma, arc, induction or other melting facility.

The scope of this invention is defined by the following claims interpreted in view of the pertinent prior art.

We claim:

1. Process for the recovery of metals selected from the group consisting of niobium, tantalum and vanadium from ferroalloys of the metal to be recovered comprising the steps of:
   a) reacting the ferroalloy with hydrogen containing gas in the absence of oxygen, at a sufficiently high temperature and for a sufficiently long period of time to render the ferroalloy friable and capable of being easily comminuted to a preselected particle size;
   b) reacting the hydrided ferroalloy in a nitrogen containing gas atmosphere in the absence of oxygen at a sufficiently high temperature and a sufficiently high pressure, for a sufficiently long period of time to form iron nitride and the metal nitride of the metal to be recovered;
   c) separating the iron nitride composition formed from the other metal nitride formed;
   d) heating the other metal nitride product of step c) to a temperature sufficient to denitride the metal nitride of the metal to be recovered;
   e) heating the denitrided metal containing product in the absence of oxygen at a temperature sufficient to melt the metal; and
   f) cooling the melted metal to recover the metal.

2. The method of claim 1, wherein the iron content of the ferroalloy is from about 20 to about 40 percent by weight.

3. The method of claim 1, wherein the hydrided ferroalloy is comminuted to a particle size smaller than about 140 mesh before reaction of the ferroalloy with a nitrogen containing gas.

4. The method of claim 1, wherein the nitriding reaction is conducted at a temperature of from about 500° C. to about 1400° C. for a sufficient period of time to render the nitrided material ferromagnetic.

5. The method of claim 1, wherein the iron nitride is separated from the other nitrides present by dissolving the iron nitride in an aqueous acid leach solution.

6. The method of claim 5, wherein the acid used is hydrochloric acid.

7. The method of claim 6, wherein the aqueous acid leach solution contains fluoride ions.

* * * * *